(12) United States Patent
Lukac et al.

(10) Patent No.: US 6,514,303 B2
(45) Date of Patent: Feb. 4, 2003

(54) ROTARY AIR SCREEN FOR A WORK MACHINE

(75) Inventors: J. Bradley Lukac, Bettendorf, IA (US); Jesse H. Orsborn, Port Byron, IL (US); Michael J. Horejsi, Sherrard, IL (US); Richard J. Crabb, Wadsworth, IL (US); Derryn W. Pikesh, Geneseo, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/946,117

(22) Filed: Sep. 4, 2001

(65) Prior Publication Data

US 2002/0088208 A1 Jul. 11, 2002

Related U.S. Application Data

(60) Provisional application No. 60/260,513, filed on Jan. 9, 2001.

(51) Int. Cl.[7] .............................................. B01D 46/04
(52) U.S. Cl. .......................... 55/289; 55/290; 55/385.3; 123/198 E; 180/68.6; 180/84
(58) Field of Search ................................ 55/282.5, 290, 55/289, 385.3, 294, 400; 123/198 E; 180/68.1, 68.4, 68.6, 84

(56) References Cited

U.S. PATENT DOCUMENTS

| | | | | |
|---|---|---|---|---|
| 399,984 A | * | 3/1889 | Gessl | ............................ 55/290 |
| 1,860,697 A | | 5/1932 | Traviss | |
| 2,473,501 A | * | 6/1949 | Bahnson, Jr. | .................. 55/290 |
| 2,493,849 A | * | 1/1950 | Bahnson, Jr. | .................. 55/290 |
| 2,553,387 A | | 5/1951 | Slama | |
| 2,636,612 A | | 4/1953 | Cording, Jr. et al. | |
| 2,716,494 A | | 8/1955 | Hursh | |
| 2,966,959 A | | 1/1961 | Neumann | |
| 3,002,585 A | | 10/1961 | Pasturczak | |
| 3,016,984 A | | 1/1962 | Getzin | |
| 3,155,473 A | * | 11/1964 | McNeil | ......................... 55/294 |
| 3,309,847 A | | 3/1967 | Donaldson | |
| 3,475,883 A | | 11/1969 | Sullivan | |
| 3,486,626 A | | 12/1969 | Close | |
| 3,487,620 A | * | 1/1970 | Klein et al. | ..................... 96/277 |
| 3,792,774 A | | 2/1974 | Rosenblum | |
| 3,816,981 A | | 6/1974 | Carnewal et al. | |

(List continued on next page.)

Primary Examiner—David A. Simmons
Assistant Examiner—Minh-chau Pham
(74) Attorney, Agent, or Firm—John William Stader; Larry W. Miller

(57) ABSTRACT

A rotary screen assembly rotatable about a rotational axis for filtering air entering an air inlet of a work machine, the screen assembly having an axially facing screen surface including an outer circumferential edge disposed around the rotational axis in radially spaced relation thereto, an elongate brush having bristles disposed along a longitudinal extent thereof in contact with the axially facing screen surface for brushing collected material and contaminants therefrom, the longitudinal extent or axis of the brush forming a chord of the outer circumferential edge spaced a distance from the rotational axis or being skewed relative to the rotational axis such that when the screen is rotated about the rotational axis in a predetermined direction a force is imparted to the collected material and contaminants by the bristles of the brush sufficient to move the collected material and contaminants radially outwardly past the circumferential edge. The screen surfaces are preferable substantially continuous and smooth and the axially facing screen surface is preferably flat and can include a plurality of screen panels removably disposed around a center hub through which the rotational axis extends, each of the screen panels including a peripheral frame defining an opening therethrough, and a screen fabric permanently attached to and preferably flush with the frame around the opening in covering relation thereto, allowing quickly and easily replacing the panels as they wear or are damaged.

31 Claims, 7 Drawing Sheets

U.S. PATENT DOCUMENTS

| | | |
|---|---|---|
| 3,837,149 A | 9/1974 | West et al. |
| 3,938,586 A | 2/1976 | Barlow et al. |
| 3,942,842 A | 3/1976 | Young, Jr. |
| 4,099,442 A | 7/1978 | Carnewal et al. |
| 4,153,436 A | 5/1979 | Cozine et al. |
| 4,299,603 A | 11/1981 | Friesen |
| 4,344,723 A | 8/1982 | Ellingson |
| 4,382,857 A | 5/1983 | Laughlin |
| 4,510,947 A | 4/1985 | Devriese |
| 4,549,887 A | 10/1985 | Joannou |
| 4,865,637 A | 9/1989 | Gruber |
| 4,874,411 A | 10/1989 | Snauwaert et al. |
| 4,906,262 A | 3/1990 | Nelson et al. |
| 4,971,026 A * | 11/1990 | Fineblum ................. 55/290 |
| 5,006,135 A | 4/1991 | Friesen |
| 5,169,524 A | 12/1992 | Meiritz et al. |
| 5,183,487 A * | 2/1993 | Lodico et al. ............. 55/289 |
| 5,188,646 A | 2/1993 | Nolen, Jr. |
| 5,238,473 A * | 8/1993 | Femiani ................... 55/290 |
| 5,316,150 A | 5/1994 | Fisher |
| 5,360,541 A | 11/1994 | Gerakios |
| 5,381,587 A * | 1/1995 | Vandergriff .............. 55/290 |
| 5,676,197 A * | 10/1997 | Riebold et al. ............ 165/41 |
| 5,988,397 A | 11/1999 | Adams et al. |
| 6,030,532 A | 2/2000 | Racine |
| 6,099,612 A | 8/2000 | Bartos |
| 6,110,242 A | 8/2000 | Young |
| 6,132,483 A | 10/2000 | Andrews |
| 6,152,307 A | 11/2000 | Adams et al. |

\* cited by examiner

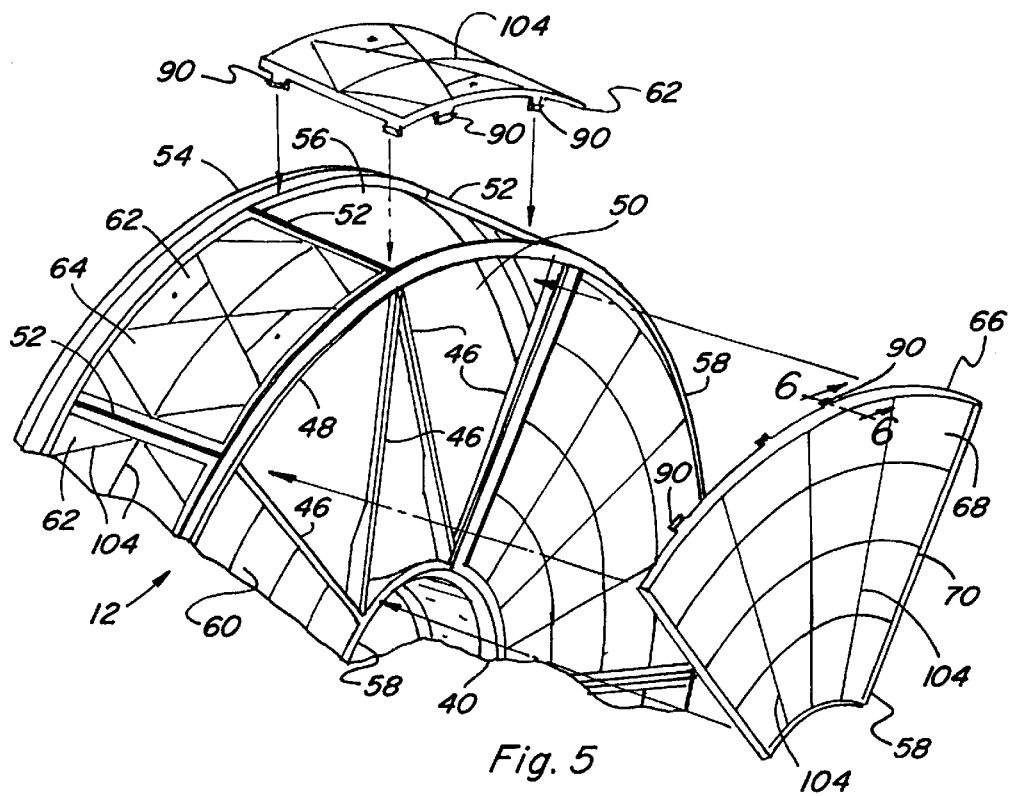
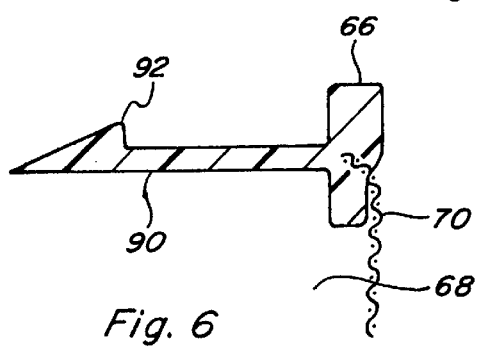
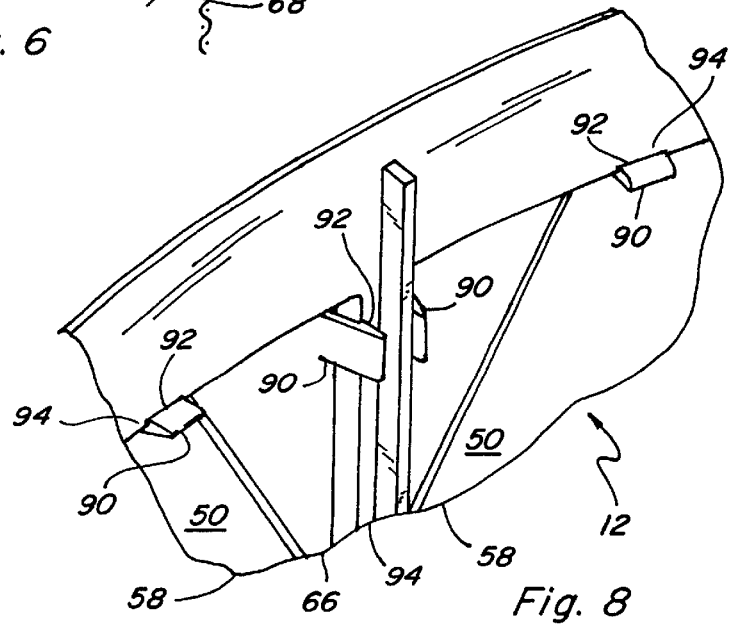

ROTARY AIR SCREEN FOR A WORK MACHINE

This application claims the benefit of U.S. Provisional Application No. 60/260,513, filed Jan. 9, 2001.

TECHNICAL FIELD

The present invention generally relates to rotary air screens for filtering air flow to heat dissipating devices used for cooling functional elements of work machines such as harvesters for cotton, grains, and corn, construction machines, forestry machines, mining machines, and the like, and, more particularly, to a self cleaning, modular rotary air screen having improved operability, wear characteristics, and other advantages over known constructions.

BACKGROUND ART

Modern work machines, particularly agricultural harvesters for plants such as cotton, grains, and corn, are typically operated under hot, dry environmental conditions wherein considerable levels of dust, chaff, and straw and/or lint, are raised and are airborne in the vicinity of the machine. These machines include various functional elements, including, but not limited to, internal combustion engines and hydraulic systems, which are cooled by heat dissipating devices such as heat exchangers or radiators. Certain levels of air flow must be directed through the heat dissipation devices during various periods, to effect proper removal of heat therefrom, and to avoid overheating and premature breakdown and failure of the functional elements and the cooling systems. Often, the air flow requirements are greatest while the levels of airborne contaminants are high, creating an increased potential for the deposition and buildup of the contaminants in small interstices and passages in screens and grills covering and protecting the heat dissipating devices, and in the devices themselves, which can reduce the cooling efficiency thereof so as to require periodically stopping the operation of the machine and cleaning the heat dissipating devices and/or screens or grills.

Rotary air filters and screens having apparatus providing at least some self-cleaning capability so as to avoid manual cleaning requirements associated with the known fixed grills and screens, are known. Reference in this regard, Carnewal et al. U.S. Pat. No. 4,099,942 issued Jul. 11, 1978 to Sperry Rand Corporation, which discloses a rotary air filter utilizing a hollow perforated rotary structure having a generally unobstructed lengthwise inner surface, and a discharge opening in line therewith through which foreign material which enters the structure through the perforations can be discharged. It is also disclosed that the filter can include a brush positioned within the structure for brushing the inner perforated surface thereof when rotated. An observed shortcoming of rotary air filters of this type, however, is the requirement of relatively large perforations in the structure which can allow relatively large amounts of foreign material into the interior thereof, some of which foreign material can pass beyond the discharge structure and collect on the radiators, engine, and other functional elements to an undesirable extent.

Reference also, West et al. U.S. Pat. No. 3,837,149 issued Sep. 24, 1974, and Nelson et al. U.S. Pat. No. 4,906,262 issued Mar. 6, 1990, both to Deere and Company, which disclose rotary screens for an engine enclosure utilizing a partial vacuum chamber for suctioning material from the outer surface of the rotary screen, thereby providing a self-cleaning capability. An observed shortcoming of these devices, however, is the deposition of the suctioned material into the air flow over the engine so as to be capable of collecting in significant quantities on and around the engine.

Still other devices are known which scrape or plow material from rotary filters, as evidenced in Hursh U.S. Pat. No. 2,716,494 issued Aug. 30, 1955 to Lukens Steel company, and Cording et al. U.S. Pat. No. 2,636,612 issued Apr. 28, 1953 to the United States of America. However, the known scraper and plow devices are necessarily of rigid construction such that, if biased or urged against a filter screen to an effective extent, would likely stretch and deform the screen over time thus lessening the cleaning effect achieved. Also, such devices, if allowed to prolongedly contact a mesh screen or the like, can rub or wear through the screen, thus necessitating replacing or repairing the screen on a more frequent than desirable basis. Further, if the leading edge of the scraper or plow wears, it can form an edge that can tear and damage the filter screen. Some of the disclosed scrapers and plows also have relatively complex geometric shapes, making them costly to make.

With regard to replacement of the filter screens, reference Gerakios U.S. Pat. No. 5,360,541 issued Nov. 1, 1994 to Albany International Corp., which discloses a modular device for the ease of use and installation of filtration textiles, which utilizes individual removable sections for holding textile fabric that can be disassembled to allow replacing the fabric. However, this is in a context wherein the filter itself is a very large rotating table, on the order of 15 to 25 feet in diameter, which makes it desirable and economical to replace only the textile fabric. In contrast, the rotary air screens of the present invention are intended for filtering air flow to work machines, particularly, agricultural harvesters, and are typically less than one third the diameter of such rotary tables, making it more desirable to have wholly replaceable screen sections, as opposed to just replaceable screen fabric. Also, since the present rotary air screens are for work machines which have limited exterior spaces not used for other purposes, it is desirable to minimize the size of the rotary air screens.

Accordingly, it would be desirable to provide a rotary air screen for agricultural machines which more effectively filters air flow therethrough, without directing air containing contaminants and foreign material over the engine and other functional elements, which does not cause accelerated deformation or wear of the screen, which is simple and advantageous costwise, which is relatively compact, and otherwise overcomes the shortcomings of the various known filter and screen constructions discussed above.

SUMMARY OF THE INVENTION

According to one aspect of the invention, a rotary air screen assembly for a work machine which is rotatable about a rotational axis for filtering air entering an air inlet of the work machine is disclosed. The screen assembly has an axially facing screen surface including an outer circumferential edge disposed around the rotational axis in radially spaced relation thereto. An elongate brush having bristles disposed along a longitudinal extent thereof is in contact with the axially facing screen surface for brushing collected material and contaminants therefrom, the longitudinal extent or axis of the brush forming a chord of the outer circumferential edge spaced a distance from the rotational axis, or being skewed relative to the rotational axis, such that when the screen is rotated about the rotational axis in a predetermined direction, a force is imparted to the collected material and contaminants by the bristles of the brush sufficient to move the collected material and contaminants radially outwardly past the circumferential edge and off of the axially facing screen surface.

According to another aspect of the invention, the screen surface can include a plurality of screen panels removably disposed around a center hub through which the rotational axis extends, each of the screen panels including a peripheral frame defining an opening therethrough, and a screen fabric permanently attached to the frame around the opening in covering relation thereto, allowing quickly and easily replacing the panels as they wear or are damaged. The preferred screen panels form a substantially continuous screen surface, and the screen fabric preferably includes openings having an average size of from about 100 to about 900 microns, which is substantially smaller than the size of screen openings of screen fabrics previously known to be used.

BRIEF DESCRIPTION OF THE DRAWINGS

A non-limiting embodiment of the present invention will be described by way of example with reference to the accompanying drawings, in which:

FIG. 5 is an enlarged fragmentary perspective view of the rotary air screen;

FIG. 6 is a fragmentary sectional view taken along line 6—6 of FIG. 5 showing construction of a screen panel of the rotary air screen;

FIG. 8 is an enlarged fragmentary perspective view of the rotary air screen, showing attachment of screen panels thereof.

BEST MODE FOR CARRYING OUT THE INVENTION

Figure 1:
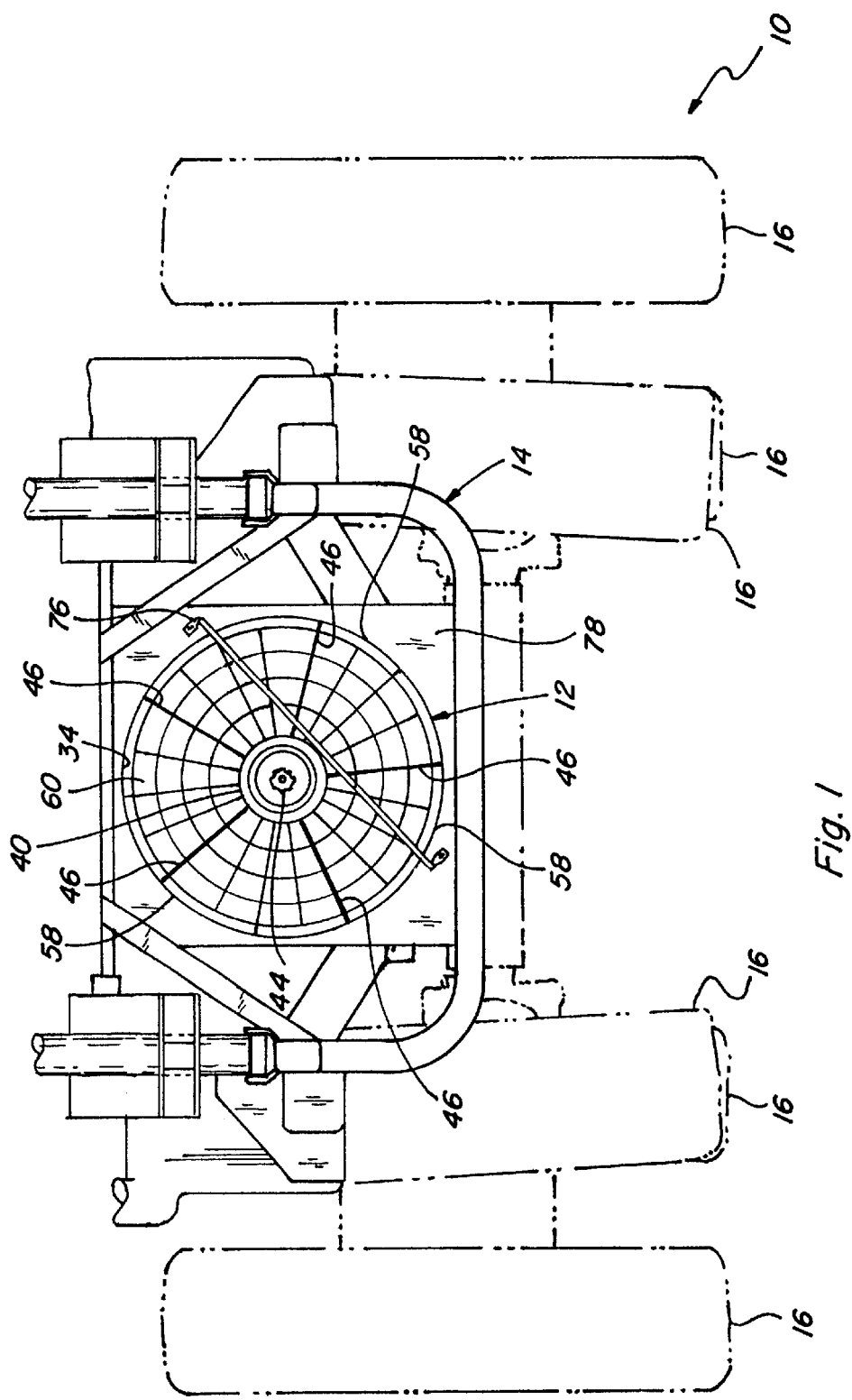
FIG. 1 is a simplified fragmentary rear elevational view of a harvester including a rotary air screen according to the present invention.
Figure 2:
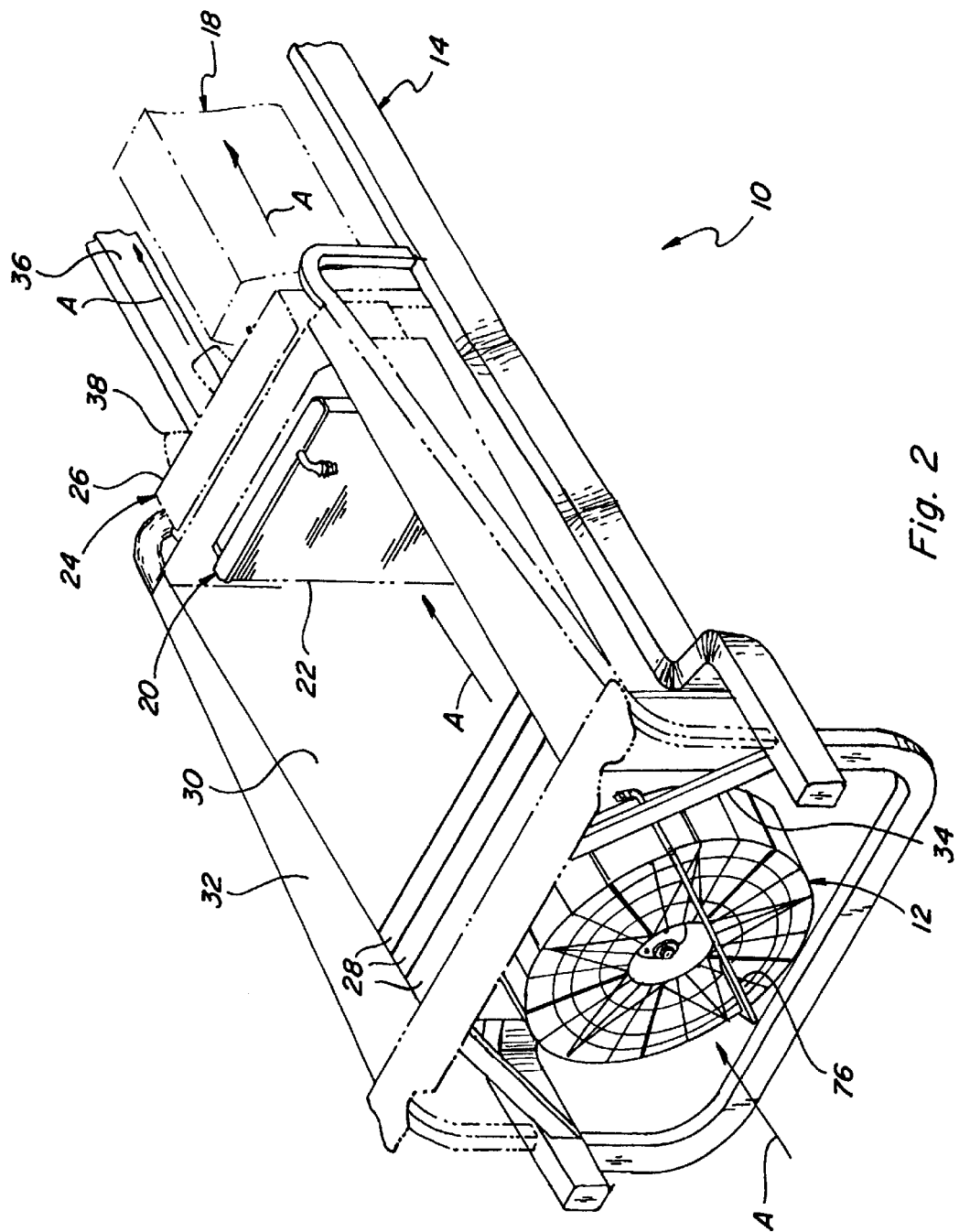
FIG. 2 is a simplified fragmentary perspective view of the harvester of FIG. 1 showing a frame thereof supporting the rotary air screen and functional elements of the harvester, including an internal combustion engine and several heat dissipating devices.

Referring now to the drawings, in FIGS. 1 and 2, a representative work machine, which is a cotton harvester 10, is shown including a rotary air screen 12 constructed and operable according to the teachings of the present invention. Harvester 10 includes a mobile frame 14 supported by a plurality of wheels 16 (in phantom) for movement over the ground for harvesting cotton from cotton plants using a plurality of row units (not shown), in the well known, conventional manner. Harvester 10 includes an internal combustion engine 18 for providing motive power to wheels 16, via a hydraulic circuit 20 including a pump (not shown) driven by engine 18, hydraulic wheel motors (also not shown) disposed for driving wheels 16, and a radiator 22 for dissipating heat from fluid circulating through circuit 20. Engine 18 is cooled by a cooling system 24 including a radiator 26 for dissipating heat from fluid circulated through system 24. Additional radiators 28 are connected to various systems of harvester 10, which can include, but are not limited to, a charge air system, an air conditioning system, and a fuel system for engine 18.

Radiators 22, 26, and 28 are supported on frame 14 at various locations along an air flow passageway 30 formed by a duct enclosure 32 (shown partially removed for clarity, connected to and extending from an air inlet 34 covered by rotary air screen 12, to a compartment 36 in which engine 18 is located. Engine 18 rotatably drives a fan 38 positioned for drawing a flow of air, denoted in FIG. 2 by arrow A, through rotary air screen 12 into air inlet 34 and through air flow passageway 30 and radiators 22, 26, and 28, and past engine 18.

Figure 3:
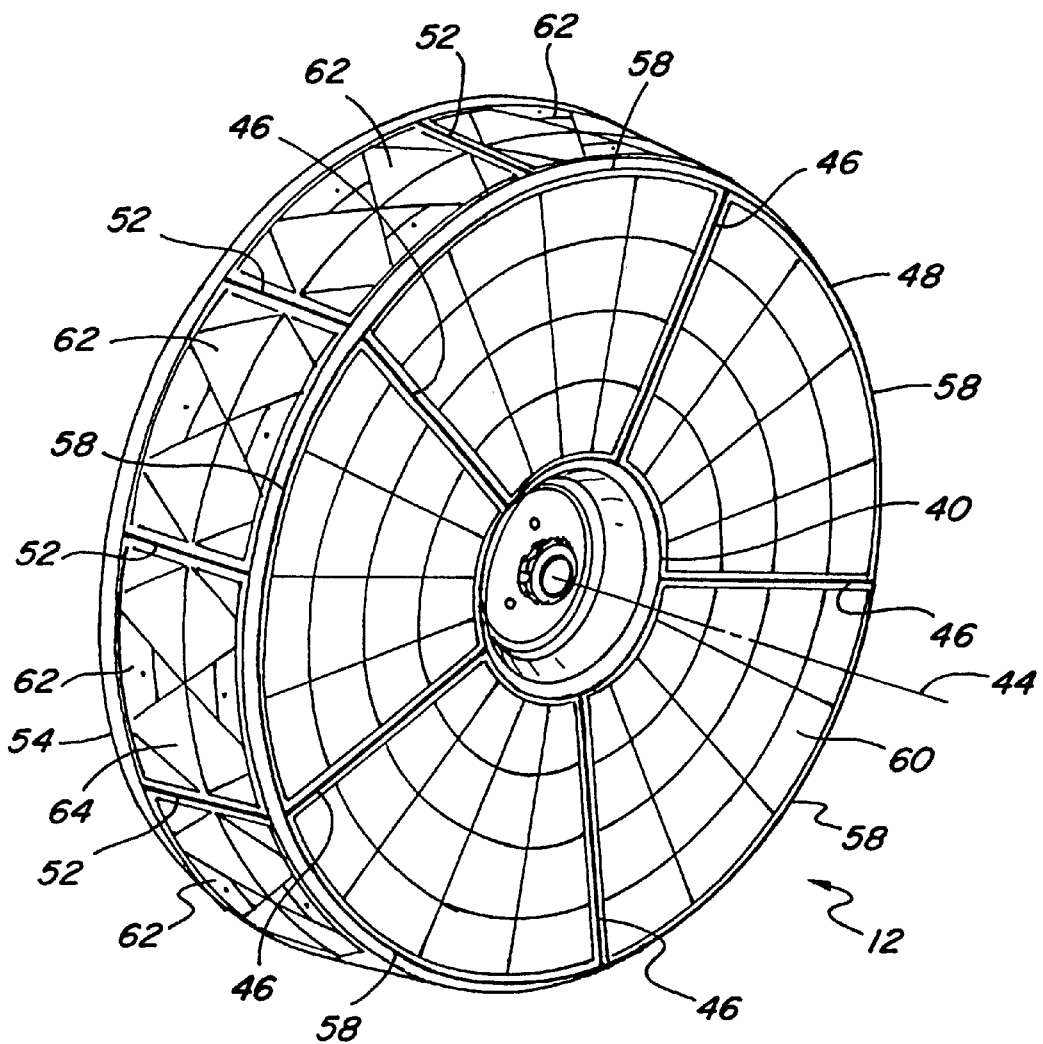
FIG. 3 is an enlarged perspective view of the rotary air screen.
Figure 4:
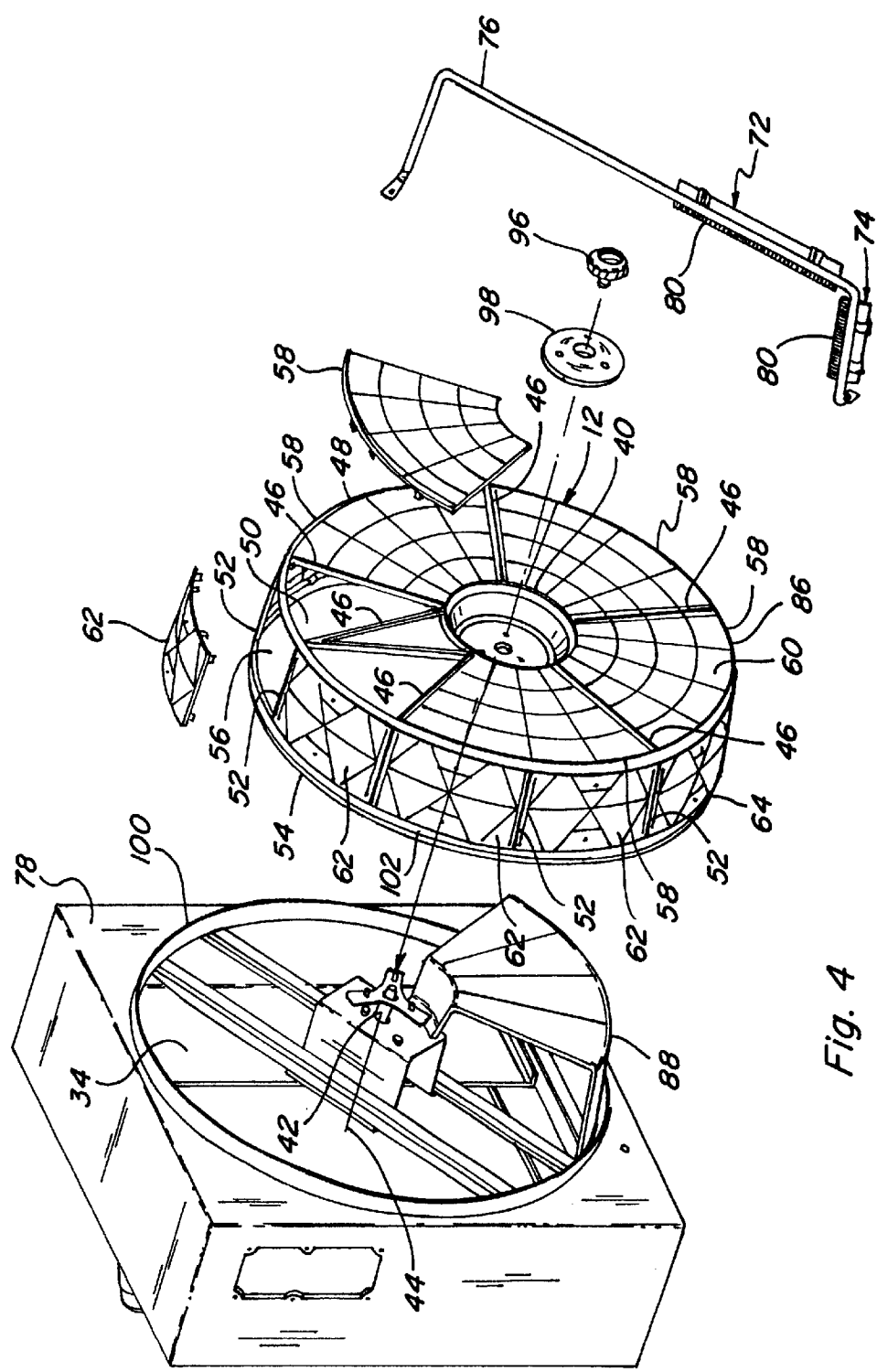
FIG. 4 is an exploded perspective view of the rotary air screen and other elements of a rotary air screen assembly.

Referring also to FIGS. 3 and 4, rotary air screen 12 is a modular assembly including a center hub 40 mounted to a rotatable output shaft 42 of a hydraulic motor supported in air inlet 34 for rotation with shaft 42 about a generally horizontal axis of rotation 44 extending through hub 40. Rotary air screen 12 includes a plurality of radial ribs 46 extending radially outwardly from hub 40 at angularly spaced locations therearound to a first outer circumferential rim 48 at leas generally coaxial with hub 40 and located radially outwardly therefrom, hub 40, radial ribs 46, and first outer circumferential rim 48 forming a structure defining a plurality of axially facing openings around hub 40, as shown in FIG. 4. A plurality of circumferential ribs 52 extend generally axially from first outer circumferential rim 48 to a second outer circumferential rim 54 axially spaced therefrom and at least generally coaxial therewith about axis of rotation 44, first and second circumferential rims 48 and 54, and first and second outer circumferential rims 48 and 54, defining a plurality of circumferentially facing openings 56 around rotary air screen 12, as also shown in FIG. 4. Referring also to FIG. 5, a plurality of axially facing screen panels 58 are removably or detachably mounted to hub 40, radial ribs 46, and the first outer circumferential rim 48, in covering relation to the plurality of axially facing openings 50, respectively, defining a generally vertical axially facing screen surface 60 for the flow of air therethrough. Similarly, a plurality of circumferential screen panels 62 are removably or detachably mounted to first and second outer circumferential rims 48 and 54 and circumferential ribs 52 in covering relation to the plurality of circumferentially facing openings 56, respectively, defining a radially facing circumferential screen surface 64 for the Flow of air therethrough. Additional ribs 46 and 52 can also be provided in spanning relation to openings 50 and 56, respectively, to support circumferential rims 48 and 54 and panels 58 and 62, as required or desired.

Referring also to FIG. 6, each of the screen panels 58 and 62 includes a peripheral frame 66 therearound defining an opening 68 therethrough, and a screen fabric 70 permanently attached to frame 66 around opening 68 in covering relation thereto. Screen fabric 70 includes a large number of interstices, perforations or other openings for the passage of air therethrough, the size of the openings being selected so as to filter out airborne material and contaminants that are desired to be prevented from entering air inlet 34. In many construction and mining environments where work machines utilizing rotary air screens, such as air screen 12, are anticipated to be used, the primary airborne material and contaminants to be filtered are dust and dirt. For filtering the typical airborne materials in these environments, screens with openings having an average size of about 0.063 inches can be used, and only about 40 percent of the typical screen surface is required to be open for air flow therethrough. However, in harsher agricultural environments, particularly some cotton fields when harvesting, and some grain fields when planting, very fine dust and additionally, airborne plant material, must be filtered. The airborne plant material in the cotton harvesting environment typically includes large quantities of elongate, fibrous lints and other strands or filaments, straw, and chaff, released from the plants as a result of the harvesting operation. In the noted grain planting environments, other very small airborne plant materials such as very small pollens and seeds may be present. The airborne dust and plant material can be so thick that a near zero visibility condition can exist. If this material were allowed to enter the passages of radiators and other heat dissipating devices, those devices would quickly clog, resulting in the problems discussed above, namely, degradation in operation of components, overheating, and failure. Additionally, it is undesirable for such materials To be allowed to pass through the radiators and settle on surfaces of engine 18 and related or adjacent functional elements of the work machine located in compartment 36 or receiving air from the air flow introduced through air inlet 34, as the contaminants can interfere with operation and service of the elements and cause undesirable heat buildup causing stress on the components and other problems. For these types of applications, to filter and prevent the passage of these fine dusts, a rotary air screen such as the present screen 12 will typically require a fine screen fabric 70, such as, for instance, a stainless steel screen fabric, having interstices, perforations or other openings having average sizes of from, but not limited to, about 100 or 125 to about 300 microns. For highly productive work machines such as harvester 10, air flow rate requirements through air screen 12 can be, for instance, as high as about 10,000 to 14,000 cubic feet per minute. At these high air flow rates, and using a fine screen fabric 70 such as that disclosed above, build up rates of the airborne materials and contaminants on screen surfaces 60 and 64, that is, the rate at which material and contaminants are filtered from the air flow and collect on the screen surfaces, will be substantial.

Here, it should be noted that in FIG. 6 the openings in screen fabric 70 are enlarged for purposes of illustration. It should also be rioted that in more conventional grain planting, harvesting and other work machine environments wherein fewer very small airborne contaminants are present, screen fabric having larger interstices, perforations or other openings can be used, for instance, having average sizes as large as about 900 to about 1000 microns or so, with good results. Here, it should also be noted that the numerical values set forth herein are not absolute values, and that the screen size best suited for a particular application and conditions should be determined based upon a variety of factors.

Figure 7:
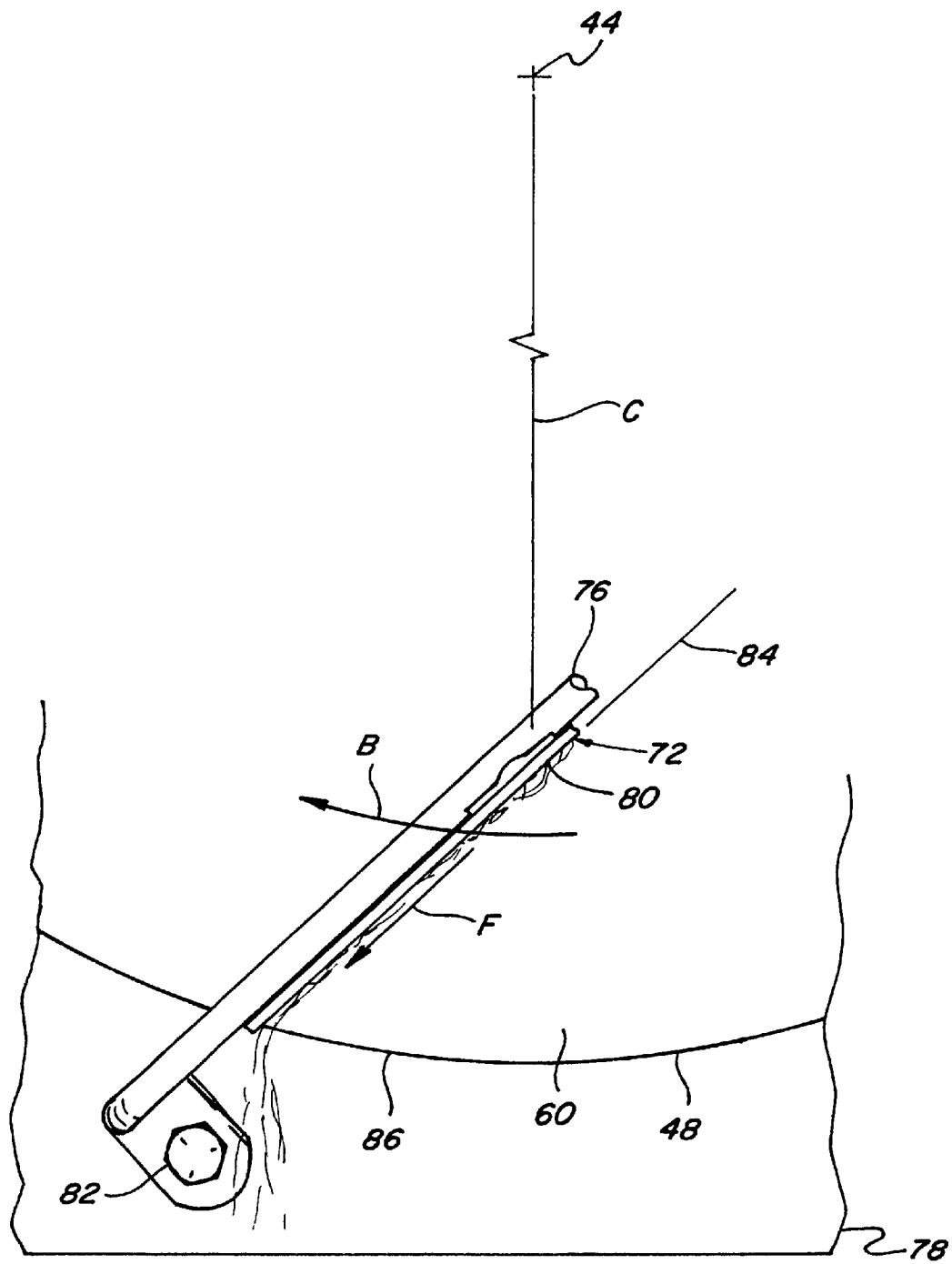
FIG. 7 is an enlarged fragmentary rear elevational view of the rotary air screen illustrating removal of material and contaminants thereon by a brush thereof.

Referring to FIGS. 4 and 7, to remove the materials and contaminants from surfaces 60 and 64, a brush 72 is provided for brushing surface 60, and a second brush 74 is provided for brushing surface 64, continuously as rotary air screen 12 is rotated. Brushes 72 and 74 are each elongate, and are mounted on a rod 76 in position for brushing the respective surfaces when the opposite ends of rod 76 are mounted to a cowling 78 which forms air inlet 34. The ends of rod 76 can be mounted to cowling 78 using suitable fasteners such as screw or bolt 82 shown in FIG. 7, as well as other devices such as clamps and the like. Each brush 72 and 74 includes a large quantity of bristles 80 preferably retained in a linear arrangement in position for contacting surfaces 60 and 64, respectively, as rotary air screen 12 is rotated relative thereto. Bristles 80 are preferably sufficiently stiff to prevent the passage of most materials and contaminants that would be anticipated to be found or collected on screen surfaces 60 and 64, yet comprise a material sufficiently softer than the material or materials comprising screen fabric 70, for example the stainless steel screen discussed above, so as to wear substantially faster than the material or materials comprising surfaces 60 and 64 as a result of the contact therebetween. Suitable materials for bristles 80 can include, but are not limited to, commercially available polymers and polymer blends including, but not limited to, polymers of the nylon family, which are soft enough so as not to significantly deform, deflect or urge screen fabric 70 away from the brush. Brushes 72 and 74 can clamped or otherwise adjustably mounted to rod 76 for allowing positioning he brushes closer to or farther from the surface to be brushed, for such purposes as providing a stiffer brushing force, and for compensating for wearing down of bristles 80, as desired or required. To facilitate the brushing of the material and contaminants by brushes 72 and 74, screen panels 58 and 62 are preferably made such that adjacent panels 58 or 62 are substantially flush one relative to the other, such that screen surfaces 60 and 64 are each substantially smooth, continuous, and uninterrupted, minimizing the areas on surfaces 60 and 64 where the material and contaminants can collect, and disruption of the material collected against the brush as the edges of panels 58, 62 move therepast, respectively. In this regard, peripheral frames 66 of the panels 58, 62 are preferably molded of a plastics material and the edges of the screen fabric 70 are molded or potted in place in frames 66 when formed forming a substantially flush surface, as best shown in FIG. 6, such chat frames 66 and the screen fabric 70 of adjacent panels 58 and adjacent panels 62 effectively present the desired substantially smooth, continuous, and uninterrupted surface, respectively. Here, it should also be noted that due to the relatively small sizes of the preferred openings of screen fabric 70, that is, in the range of from about 100 to about 900 microns, the screen fabric 70 itself presents a very smooth surface itself.

Referring more particularly to FIG. 7, importantly, to more effectively clean axially facing screen surface 60, rod 76 is mounted to cowling 78 such that brush 72 contacts surface 60 along a line corresponding to a Longitudinal extent or axis 84 of brush 72, the longitudinal extent or axis 84 being skewed relative to axis of rotation 44, or comprising a chord of an outer circumferential edge 86 of surface 60, sufficiently such that when screen 12 is rotated about rotational axis 44 in the direction denoted by arrow B, a resultant force, denoted by arrow F, is imparted to the material and contaminants collected or retained by bristles 80 in the direction shown for moving the collected material and contaminants outwardly along brush 72, that is, away from axis 44, past outer circumferential edge 86. Due to the downward orientation of brush 72, gravity is also a component of the force F. It has been observed that the force F is a function of the rotational velocity of rotary air screen 12 and that force F is greater toward circumferential edge 86. That is, force F increases as the rotational velocity of air screen 12 is increased, and the magnitude of force F near the circumferential edge 86 is greater than that near axis 44 on a given air screen. Thus, it should be appreciated that a greater force F can be achieved by increasing the velocity of rotation and/or the diameter of air screen 12, and that by utilizing a greater rotational velocity a smaller diameter air screen can be used. For ease of manufacture and low cost, brush 72 is preferably at least generally straight, and longitudinal axis 84 thereof is oriented at a suitable angle for generating the required force, for instance at an angle of about 45degrees relative to vertical, as denoted by line C, for a generally or near vertical screen surface such as surface 60, it being recognized that other angles or orientations may be more suitable for other applications based upon a variety of factors such as the mesh size and other characteristics of screen fabric 70, the adhesion characteristics or stickiness between material collected and screen fabric 70, environmental characteristics such as relative humidity, and he like, and it being recognized that brush 72 can have more curved or bent shapes, as desired.

Referring more particularly to FIG. 4, to facilitate the brushing and movement of the collected material and contaminants across surface 60 toward edge 86, a generally triangular or wedge shape baffle 88 is mounted to cowling 78 in covering relation to an area of air inlet 34 in front or upstream of and/or behind or downstream of, with respect to the air flow, brushes 72 and 74, for decreasing or eliminating air flow through screen surfaces 60 and 64 in the area including brushes 72 and 74. In this context, it has been found that utilizing a screen fabric 70 having a small mesh size such as discussed above, namely, having interstices, perforations or other openings having sizes of from about 125 to about 300 microns, also facilitates the brushing away of the material such as cotton lint typically encountered, as the lint does not pass through the smaller mesh in any significant amount, thereby enabling the lint to be easily brushed off by brushes 72 and 74. One reason for this is believed to be that this mesh size is so small that no significant portion of the cotton lint enters or penetrates the interstices or perforations thereof, so that it is unable to mechanically fasten to the screen, or become entwined with or wrapped therearound.

Due to the modular construction of rotary air screen 12, screen panels 58 and 62 can be easily removed and replaced, as required or desired, for instance, in the event one or more of tie panels is or are damaged or become too worn, without requiring removal and replacement of the entire rotary air screen 12. Panels 58 and 62 can also be replaced in the event the mesh size or material thereof is incorrect or not well suited for the conditions of a particular application.

Referring again to FIGS. 5 and 6, and also to FIG. 8, to facilitate replacement of the individual panels 58, 62 of rotary air screen 12, each panel 58, 62 includes a plurality of tabs 90 extending outwardly from peripheral frame 66 thereof and insertable into openings 50 and 56, each tab 90 having a projection 92 having a barbed shape engageable with edges or lips 94 located on hub 40, ribs 46, 52, and rims 48, 54 within openings 50 and 56, for retaining panels 58, 62 in covering relation to openings 50 and 56, respectively. In this regard, projections 92 are preferably molded integrally with peripheral frame 66, the plastics or other material of frame 66 being selected such that projections 92 will be resiliently and yieldably biased toward lips 94, although it should be recognized that other constructions can alternatively be used, such as, but not limited to, metal or plastics clips which attach to peripheral frame 66 and include projections 92 or other elements cooperatively engageable with lips 94 or other elements on hub 40, ribs 46, 52 and rims 48, 54. To install a panel 58 or 62, the panel is merely placed over a selected correspondingly shaped opening 50 or 56, with projections 92 positioned for engaging lips 94, and peripheral frame 66 is pressed toward and against hub 40, ribs 46, 52, and/or rims 48, 54, to engage projections 92 with lips 94. To remove a panel 58 or 62, peripheral frame 66 is merely pried or pulled away from hub 40, ribs 46, 52, and/or rims 48, 54, to release projections 92 from lips 94. Here, it should be further understood that it is contemplated that a variety of alternative elements can be utilized for retaining panels 58 and 62 over openings 50 and 56, including, but not limited to, mechanical fasteners such as screws, hook and loop fasteners, and the like, adhesives, or magnets.

Referring again to FIG. 4, as noted above, center hub 40 of rotary air screen 12 is mounted to a rotatable output shaft 42 of a hydraulic motor for rotation therewith. To allow easily and quickly removing rotary air screen 12 for service and accessing air inlet 34, hub 40 is mounted to hydraulic motor shaft 42 with a hand screw 96 that can be tightened and loosened manually, and a flange 98. To prevent air from entering inlet 34 between cowling 78 and rotary air screen 12 thereby bypassing the filtering effect of rotary air screen 12, seal elements are provided including an annular seal 100 mounted to cowling 78 around air inlet 34 for sealably engaging a circumferential sealing strip 102 extending around second outer circumferential rim 54. Seal 100 and/or strip 102 preferably comprises a material having a substantially lower coefficient of friction compared to the second circumferential rim 54, such as one or more synthetic elastomers containing molydisulfide, Teflon® brand fluorine resin material, and/or silicone. For instance, seal 100 and/or strip 102 can comprise Teflon® brand fluorine resin material, or a similar commercially available low friction, high wearability material. To secure scrip 102 to rim 54, rim 54 can be molded around a portion of strip 102 or around retainers connected thereto, or mechanical fasteners, adhesives or the like can be used.

Still further, referring again to FIG. 5, it should be observed that the screen fabric 70 of panels 58 and 62 is traversed by a grid of support braces 104 located on the air inlet side thereof. These support braces 104 provide added support for the screen fabric 70 to maintain the flush, continuous surface and prevent the screen fabric from deforming or deflecting away from brushes 72 and 74 and thereby lessening the effectiveness thereof.

Figure 9:
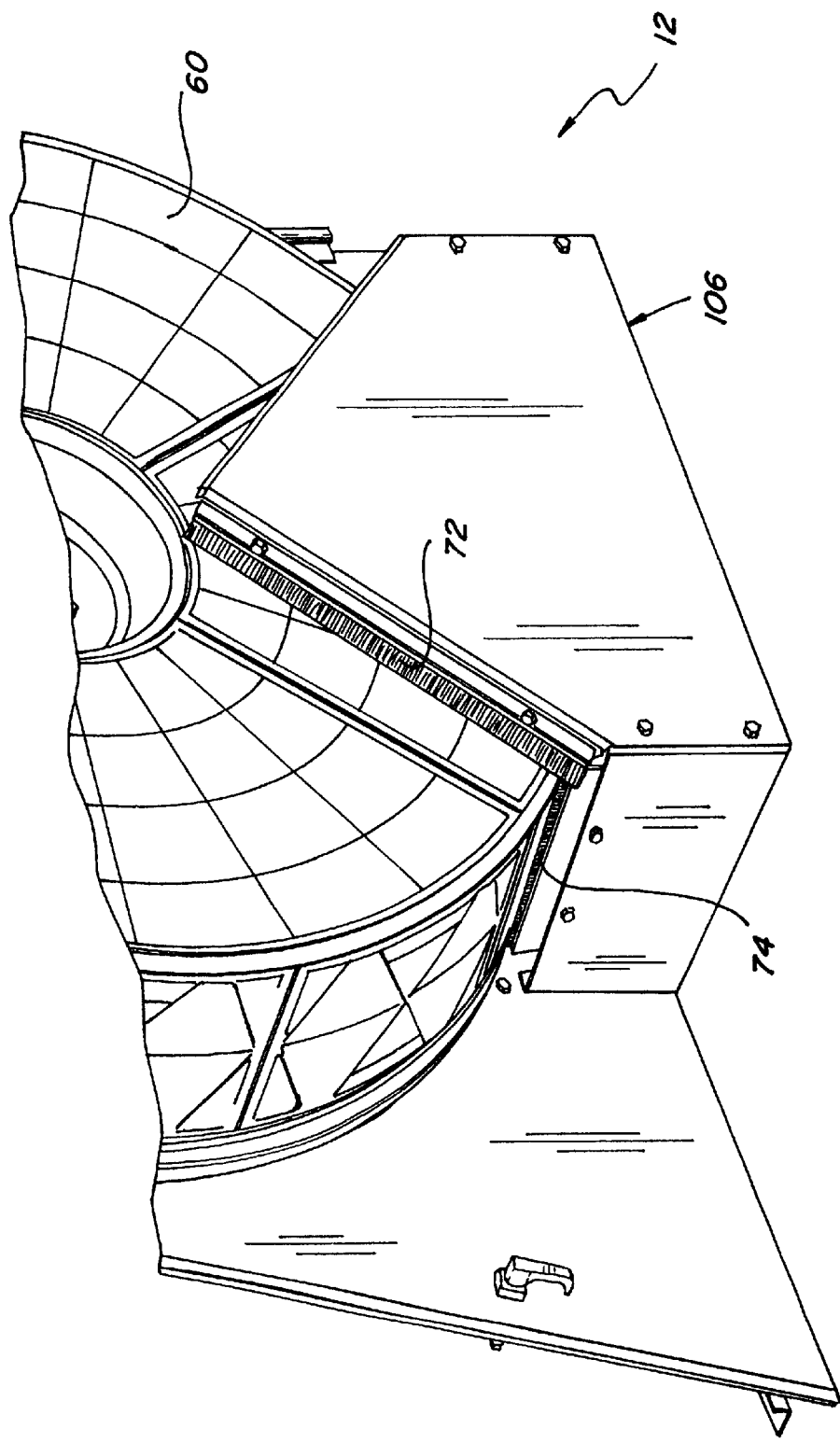
FIG. 9 is an enlarged fragmentary perspective view of the rotary air screen including a combined baffle and brush holding apparatus according to the invention.

In FIG. 9, rotary air screen 12 is shown including a combined external baffle and brush holder apparatus 106 for holding brushes 72 and 74 and decreasing or limiting air flow in the area of brushes 72, 74. Apparatus 106 can be used as the sole baffle or can be used with an internal baffle such as baffle 88. The baffle portion of apparatus 106 is generally triangular or wedge shape, and has an open bottom which forms a chute such that material collected by brushes 72, 74 can drop therethrough to the ground. An advantage of the external location of the baffle portion is that prevents material collected by brushes 72, 74 from "jumping" over the brushes as rotary air screen 12 rotates. Another advantage is that the need for rod 76 for holding brushes 72, 74 is eliminated. Here, it should be noted that baffle 88 and the baffle portion of apparatus 106 cover about an 80 degree portion of axially facing screen surface 60, centered at about the 6 o'clock position, and it should be recognized that a smaller or Larger segment of the axial face could be covered, and that it could be centered anywhere between about the 4 o'clock and the 8 o'clock positions.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

what is claimed is:

1. In a rotary screen assembly rotatable about a rotational axis, the screen assembly having an axially facing screen surface including an outer circumferential edge disposed around the rotational axis in radially spaced relation thereto, an improvement comprising an elongate brush having a longitudinal axis and bristles disposed along the longitudinal axis in contact with the axially facing screen surface for brushing collected material and contaminants therefrom, the longitudinal axis extending as a chord to the outer circumferential edge spaced a distance from the rotational axis such that when the screen is rotated about the rotational axis a force is imparted to the collected material and contaminants by the bristles of the brush sufficient to move the collected material and contaminants radially outwardly past the circumferential edge, the improvement further comprising a baffle disposed such that the air is not drawn though the screen surface in close proximity to the brush.

2. In the rotary screen assembly of claim 1, the screen further comprising a circumferential screen surface extending generally axially with respect to the rotational axis around tile circumferential edge of the axially facing screen surface, the improvement further comprising a second brush positioned for brushing collected material and contaminants from the circumferential screen surface.

3. In the rotary screen assembly of claim 1, the improvement further comprising the axially facing screen surface including a plurality of screen panels detachably mounted around the rotational axis.

4. In the rotary screen assembly of claim 3, the improvement further comprising each of the screen panels including a frame defining an opening therethrough, and a screen fabric permanently mounted to the frame around the opening in covering relation thereto, such that the frames and screen fabric of the screen panels form a substantially continuous smooth surface.

5. In the rotary screen assembly of claim 4, wherein the screen fabric has openings therethrough having an average size of from about 100 to about 900 microns.

6. A rotary screen assembly for filtering air flow into an agricultural machine, comprising:
a screen structure supported for rotation about a rotational axis, the screen structure including an axially facing screen surface having a plurality of interstices therein for the passage of the air flow therethrough and an outer circumferential edge disposed around the rotational axis in radially spaced relation thereto;
an elongate brush having bristles disposed in contact with the axially facing screen surface for brushing collected material and contaminants therefrom, the brush having a longitudinal axis skewed relative to the rotational axis sufficiently such that when the screen is rotated about the rotational axis a force is imparted to the collected material and contaminants by the bristles of the brush in a direction for moving the collected material and contaminants radially outwardly along the brush past the circumferential edge of the surface.

7. The rotary screen assembly of claim 6, wherein the screen surface is at least generally vertical and the longitudinal axis is oriented at about a 45 degree angle to vertical.

8. The rotary screen of claim 6, wherein the screen surface comprises a plurality of screen panels removably disposed around a center hub through which the rotational axis extends, each of the screen panels including a peripheral frame defining an opening therethrough, and a screen fabric permanently attached to the frame around the opening in covering relation thereto, such that the panels form a substantially continuous surface around the center hub.

9. The rotary screen of claim 8, wherein the peripheral frame of each of the screen panels comprises a molded plastics structure and the screen fabric includes edge portions molded in the plastics structure forming a substantially flush surface.

10. The rotary screen of claim 9, wherein the peripheral frame of each of the screen panels comprises at least one support brace spanning the opening therethrough for supporting the screen fabric.

11. The rotary screen assembly of claim 6, further comprising a circumferential screen surface extending generally axially with respect to the rotational axis around the circumferential edge of the axially facing screen surface, and a second brush positioned for brushing collected material and contaminants from the circumferential screen surface.

12. The rotary screen assembly of claim 11, wherein the circumferential screen surface comprises a plurality of removable screen panels.

13. A rotary air screen for an air inlet of a work machine, comprising:
a center hub mountable to a rotatable member for rotation therewith about an axis of rotation extending through the hub;
a plurality of radial ribs extending radially outwardly from the center hub at angularly spaced locations therearound co a first outer circumferential rim at least generally coaxial with the hub and located radially outwardly therefrom, the hub, the radial ribs, and the first outer circumferential rim defining a plurality of axially facing openings;
a plurality of circumferential ribs extending generally axially from the first outer circumferential rim to a second outer circumferential rim axially spaced therefrom and at least generally coaxial therewith, the first and second circumferential rims and the circumferential ribs defining a plurality of circumferentially facing openings;
a plurality of screen panels removably mounted to the hub, the radial ribs, and the first outer circumferential rim in covering relation to the plurality of axially facing openings, respectively, defining a substantially continuous axially facing screen surface for the flow of air therethrough to the air inlet; and
a plurality of screen panels removably mounted to the first and second circumferential rims and the circumferential ribs in covering relation to the plurality of circumferentially facing openings, respectively, defining a radially facing circumferential screen surface for the flow of air therethrough to the air inlet.

14. The rotary air screen of claim 13, wherein the screen panels each include a peripheral frame defining an opening therethrough, and a screen fabric permanently attached to the frame around the opening therethrough in covering relation to the opening and in flush relation with the peripheral frame.

15. The rotary air screen of claim 14, wherein the peripheral frame of each of the screen panels comprises a molded plastics material and the screen fabric includes edge portions molded in the plastics material, forming a substantially flush surface.

16. The rotary air screen of claim 13, further her comprising an elongate brush having bristles disposed in contact with the axially facing screen surface for brushing collected material and contaminants therefrom, the brush having a longitudinal extent skewed relative to the rotational axis sufficiently such that when the screen is rotated about the rotational axis in a predetermined direction a force is imparted to the collected material and contaminants by the bristles of the brush in a direction for moving the collected material and contaminants radially outwardly along the brush past the circumferential edge of the surface.

17. The rotary air screen of claim 16, wherein the screen surface is at least generally vertical and the brush has a longitudinal axis oriented at about a 45 degree angle to vertical.

18. The rotary air screen of claim 13, further comprising a seal element extending circumferentially around the second circumferential rim, the seal element comprising at least one synthetic fluorine containing resin having a substantially lower coefficient of friction compared to the second circumferential rim.

19. The rotary air screen of claim 16, further comprising a baffle disposed such chat air flow through the screen surface in close proximity to the brush is reduced.

20. The rotary air screen of claim 16, further comprising a second brush positioned for brushing material and contaminants from the circumferential screen surface.

21. The rotary air screen of claim 19, wherein the baffle is located externally of the air screen and the brush is mounted to the baffle.

22. A rotary air screen for an air inlet of a work machine, comprising:

a center hub mountable to a rotatable member for rotation therewith about an axis of rotation extending through the hub;

a plurality of radial ribs extending radially outwardly from the center hub at angularly spaced locations therearound to an outer circumferential rim at least generally coaxial with the hub and located radially outwardly therefrom, the hub, the radial ribs, and the outer circumferential rim forming a structure defining a plurality of axially facing openings; and a plurality of screen panels removably mounted to the structure in covering relation to the plurality of axially facing openings, respectively, defining a substantially smooth, continuous axially facing screen surface for the flow of air therethrough to the air inlet.

23. The rotary air screen of claim 22, wherein the axially facing screen surface is substantially flat.

24. The rotary air screen of claim 22, wherein the screen surface includes openings therethrough having an average size of from about 100 to about 900 microns.

25. The rotary air screen of claim 22, wherein the screen surface includes openings therethrough having an average size of from about 125 to about 300 microns.

26. The rotary air screen of claim 22, wherein the screen surface comprises a stainless steel screen material.

27. The rotary air screen of claim 22, further comprising an elongate brush having bristles disposed in contact with the axially facing screen surface for brushing collected material and contaminants therefrom, the brush having a longitudinal extent skewed relative to the rotational axis sufficiently such that when the screen is rotated about the rotational axis in a predetermined direction a force is imparted to the collected material and contaminants by the bristles of the brush in a direction for moving the collected material and contaminants radially outwardly along the brush past the circumferential edge of the surface.

28. The rotary air screen of claim 27, wherein the screen surface is at least generally vertical and he brush has a longitudinal axis oriented at about a 45 degree angle to vertical.

29. The rotary air screen of claim 28, further comprising a baffle disposed such that air flow through the screen surface in close proximity to the brush is reduced or eliminated.

30. A rotary air screen for an air inlet of a work machine, comprising:

at least one screen panel mounted for rotation in covering relation to the air inlet, the screen panel comprising a screen material having a plurality of openings therethrough for the flow of air therethrough to the air inlet, the openings having an average size of less than about 900 microns.

31. The rotary air screen of claim 30, wherein the openings have an average size of less than about 300 microns.

* * * * *